C. E. PECKHAM.
Revolving Horse Hay-Rakes.
No. 152,164.  Patented June 16, 1874.
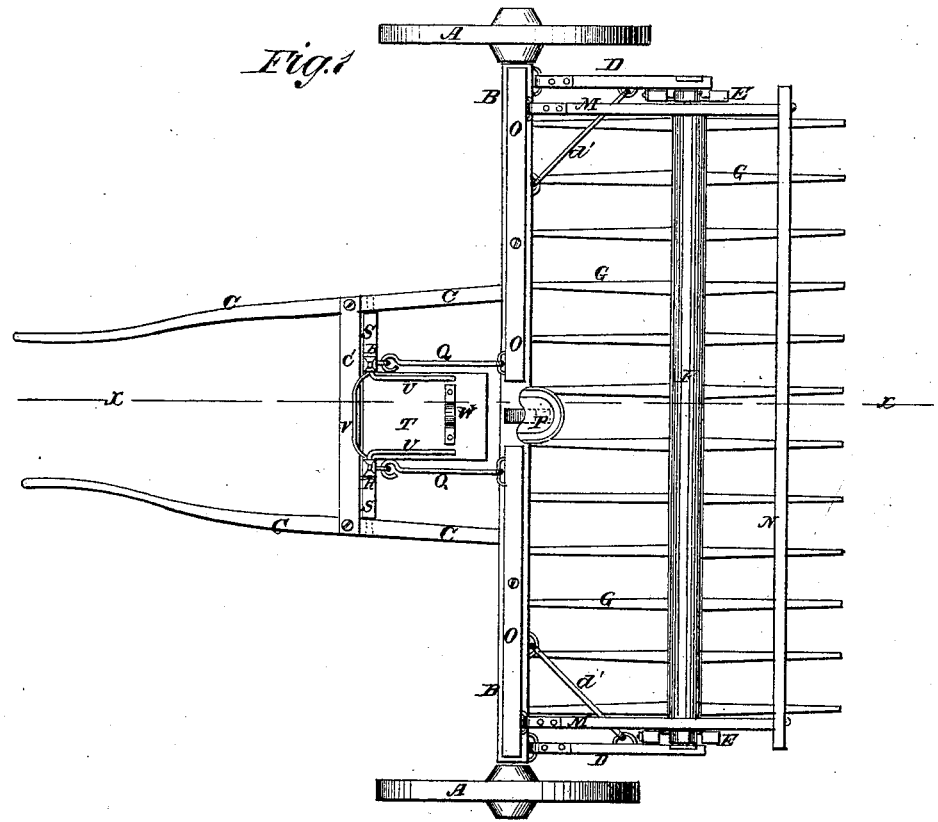
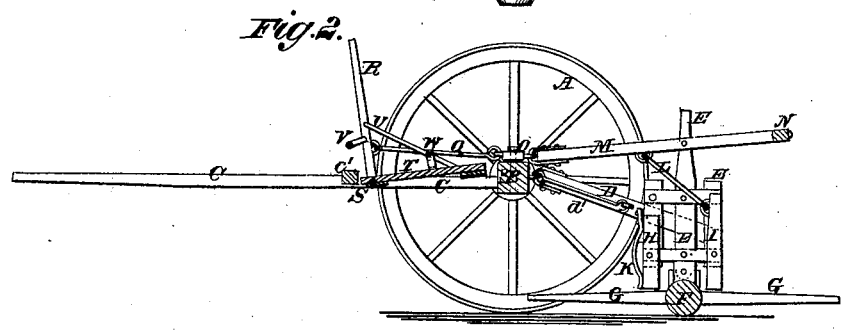
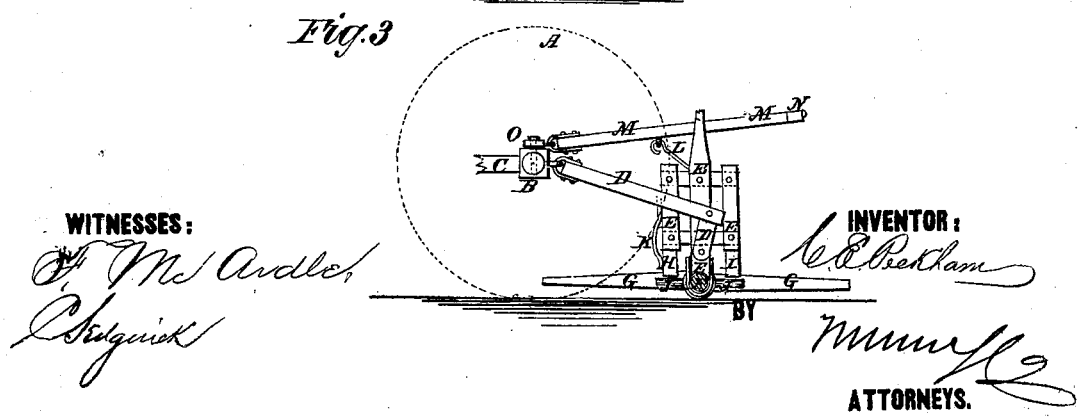
WITNESSES:  INVENTOR:
BY
ATTORNEYS.

UNITED STATES PATENT OFFICE.

CLARENCE E. PECKHAM, OF COLUMBIA × ROADS, PENNSYLVANIA.

IMPROVEMENT IN REVOLVING HORSE HAY-RAKES.

Specification forming part of Letters Patent No. 152,164, dated June 16, 1874; application filed May 23, 1874.

*To all whom it may concern:*

Be it known that I, CLARENCE E. PECKHAM, of Columbia × Roads, in the county of Bradford and State of Pennsylvania, have invented a new and useful Improvement in Horse Hay-Rakes, of which the following is a specification:

Figure 1 is a top view of my improved rake. Fig. 2 is a vertical section of the same, taken through the line $x\,x$, Fig. 1. Fig. 3 is an end view of the same, the wheel being removed.

Similar letters of reference indicate corresponding parts.

My invention has for its object to improve the construction of the revolving horse hay-rake in such a way as to enable it to be readily operated with the hand, or with the feet, by the driver while sitting upon his seat.

The invention consists in the combination of the frames, the pivoted bars, the springs, the connecting-rods, the pivoted arms, the levers, the connecting-rods, the upright levers, the rock-bar, and the platform with the rake-head, the arms, the axle, and the shafts of a revolving horse hay-rake, as hereinafter fully described.

A are the wheels, which revolve upon the journals of the axle B, to which the shafts C are rigidly attached. To the rear side of the end parts of the axle B are hinged the forward ends of the arms D, the connection being strengthened by braces $d'$. The rear ends of the arms D project downward, and are pivoted to the lower part of the central bars of the frames E. The lower ends of the central bars of the frames E project below the lower ends of the side bars of said frames, and are connected with the rake-head F, to which the rake-teeth G are attached by iron straps, which pass around said rake-head F. To the lower parts of the side bars of the frames E are pivoted the short bars H I, the lower ends of which rest upon the end parts of short pins J, which pass through the said rake-head F. The lower end of the forward bar H is held in place upon the pin J by a spring, K, the upper end of which is attached to the forward edge of the forward side bar of the frame E, and the lower part of which rests against the forward edge of the said bar H. To the upper end of the rear pivoted bar I is pivoted the rear end of a connecting-rod, L, the forward end of which is pivoted to the bar M, the rear part of which is pivoted to the upwardly-projecting end of the central bar of the frame E. The rear ends of the two bars, M, are connected and held in proper relative position by a long bar, N. The forward ends of the bars M are pivoted to the outer ends of two levers, O, which extend along and are pivoted to the upper side of the axle B. The levers O extend nearly to the driver's seat P, which is attached to the center of the axle B, and to their inner ends are pivoted the rear ends of two short rods, Q, the forward ends of which are pivoted to two short upright levers, R. The lower ends of the levers R are rigidly attached to the rock-bar S, the ends of which are pivoted to the shafts C at the rear side of their cross-bar $c'$. To the side of the rock-bar S is rigidly attached a small platform, T. The connection between the upright levers R, the rock-bar S, and the platform T, is strengthened by brace-rods U, the lower ends of which are attached to the said platform, and their upper ends are attached to the said levers. The levers R are connected by a cross-bar, V, and to the platform T is attached a loop, W, to receive the operator's foot, so that he can raise the said platform by lifting with one foot while he presses against the cross-bar V with the other. By this construction, by raising the platform T above a horizontal position, the bars I will be pressed down upon the rear ends of the pins J, so as to raise the points of the teeth G, and by pressing the platform T below a horizontal position the bars H will be pressed down upon the forward ends of the pins J, and the bars I will be raised from the rear ends of said pins J, causing the forward ends of the rake-teeth G to catch upon the ground, revolving the rake and discharging the collected hay.

Having thus described my invention, what I claim as new, and desire to secure by Letters Patent, is—

The combination of the frames E, the pivoted bars H I, the springs K, the connecting-rods L, the arms M, the levers O, the connecting-rods Q, the upright levers R, the rock-bar S, and the platform T, with the rake-head F, teeth G, the arms D, the axle B, and the shafts C of a revolving horse hay-rake, substantially as herein shown and described.

CLARENCE E. PECKHAM.

Witnesses:
S. W. SHEPARD,
FRANCIS HUNTLY.